(12) United States Patent
Ueda et al.

(10) Patent No.: US 8,282,106 B1
(45) Date of Patent: Oct. 9, 2012

(54) GLAND PACKING

(75) Inventors: Takahisa Ueda, Sanda (JP); Masaru Fujiwara, Hyogo (JP)

(73) Assignee: Nippon Pillar Packaging Co., Ltd., Yodogawa-ku, Osaka-shi, Osaka (JP)

( * ) Notice: Subject to any disclaimer, the term of this patent is extended or adjusted under 35 U.S.C. 154(b) by 4031 days.

(21) Appl. No.: 09/592,761

(22) Filed: Jun. 13, 2000

(30) Foreign Application Priority Data

May 9, 1994 (JP) .......................... 6-94930

(51) Int. Cl.
*F16J 15/20* (2006.01)
*F16J 15/30* (2006.01)
(52) U.S. Cl. .................. 277/528; 277/538; 277/539
(58) Field of Classification Search .............. 277/510, 277/534–541, 610, 633, 528
See application file for complete search history.

(56) References Cited

U.S. PATENT DOCUMENTS

| | | | | |
|---|---|---|---|---|
| 1,381,931 A | * | 6/1921 | Ostrander | 277/534 |
| 1,787,020 A | * | 12/1930 | Sautter | 277/533 |
| 1,868,199 A | * | 7/1932 | Pelterie | 277/437 |
| 1,924,555 A | * | 8/1933 | Hubbard | 277/530 |
| 2,357,257 A | * | 8/1944 | Goetze | 277/610 |
| 3,179,426 A | * | 4/1965 | Duer | 277/529 |
| 4,090,719 A | * | 5/1978 | Simanskis et al. | 277/448 |
| 4,116,451 A | * | 9/1978 | Nixon et al. | 277/554 |
| 4,327,923 A | * | 5/1982 | Chesterton et al. | 277/531 |
| 4,394,023 A | * | 7/1983 | Hinojosa | 277/539 |
| 4,451,047 A | * | 5/1984 | Herd et al. | 277/539 |
| 4,892,320 A | * | 1/1990 | Tuckmantel | 277/535 |
| 5,201,532 A | * | 4/1993 | Salesky et al. | 277/530 |
| 5,297,805 A | * | 3/1994 | Merkin et al. | 277/322 |
| 5,411,274 A | * | 5/1995 | Yahagi et al. | 277/626 |
| 5,687,974 A | * | 11/1997 | Wilkinson et al. | 277/537 |

* cited by examiner

*Primary Examiner* — Thomas Beach
*Assistant Examiner* — Nicholas L Foster
(74) *Attorney, Agent, or Firm* — Bacon & Thomas, PLLC

(57) ABSTRACT

A gland packing which is made of a material configured by windingly laminating an expanded graphite tape into a spiral shape. In the gland packing, ring-like projected parts are disposed on end faces of a die mold packing part made of an expanded graphite tape windingly laminated into a spiral shape so as to be integrated with the part. Ring-like seal members are brought into tight contact with the end faces of the die mold packing part excluding the ring-like projected parts in such a manner that the ring-like projected parts are projected in an axial direction beyond the outer faces of the respective ring-like seal members.

2 Claims, 14 Drawing Sheets

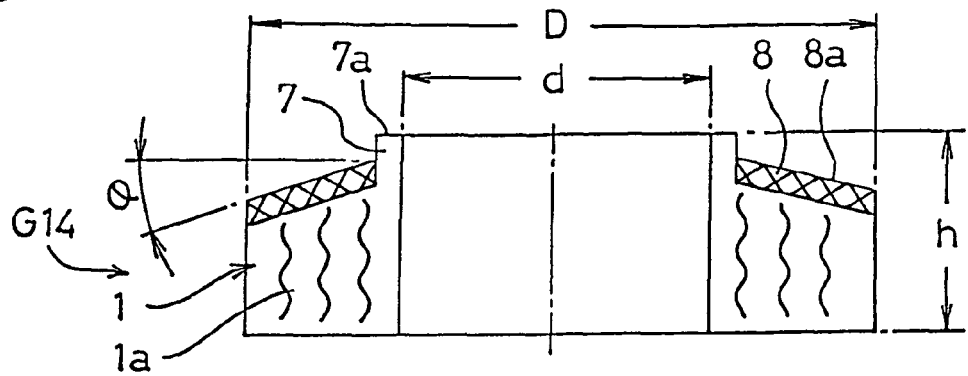
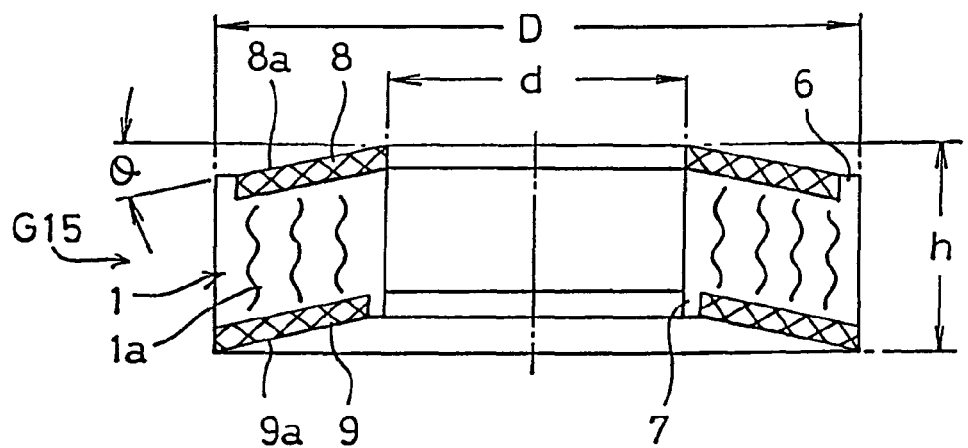
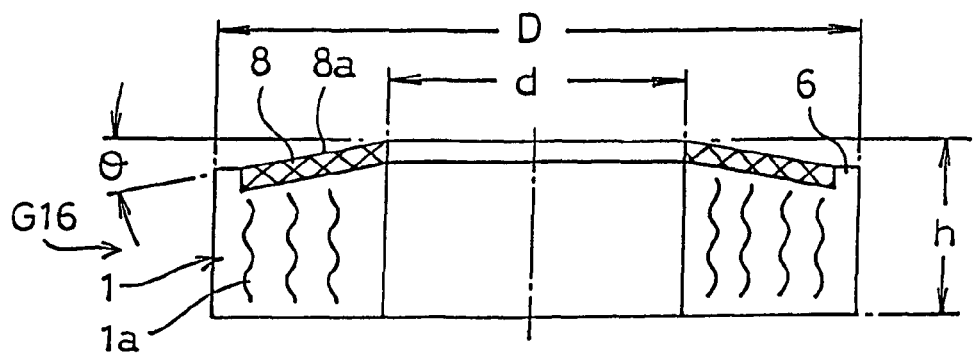

Fig. 23
| KINDS | | STRESS GENERATED WHEN COMPRESSED |
|---|---|---|
| PACKINGS OF THE INVENTION | G 1 | 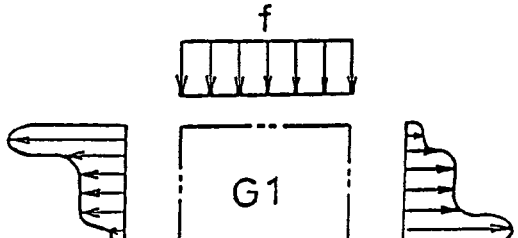 |
| | G 6 | 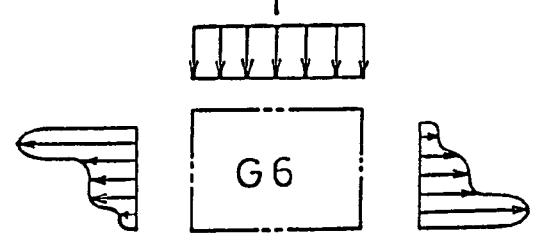 |
| PRIOR ART PACKING | G 0 1 | 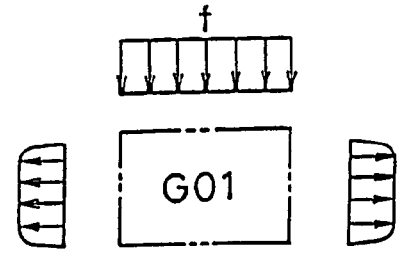 |
| COMPARISON PACKINGS | G 0 2 | 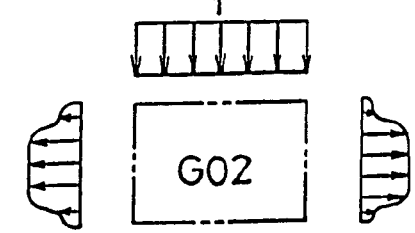 |
| | G 0 3 | 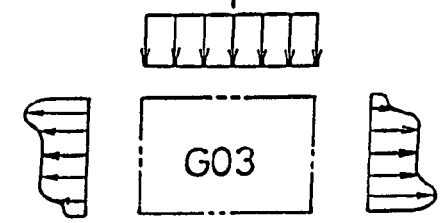 |

Fig. 24

| LEAK AMOUNT | USE EXAMPLE 1 (FIG.18) | USE EXAMPLE 2 (FIG.19) | USE EXAMPLE 3 (FIG.20) | USE EXAMPLE 4 (FIG.20) | USE EXAMPLE 5 (FIG.20) | USE EXAMPLE 6 (FIG.26) | USE EXAMPLE 7 (FIG.27) | USE EXAMPLE 8 (FIG.29) |
|---|---|---|---|---|---|---|---|---|
| TIGHTENING FACE PRESSURE 100 | 0.2 | 0.1 | 1.0 | 0.2 | 0.5 | 90 | 100 | 60 |
| TIGHTENING FACE PRESSURE 200 | 0.05 | 0.008 | 0.01 | 0.05 | 0.03 | 1 | 3 | 2 |
| TIGHTENING FACE PRESSURE 300 | 0.0003 | 0.01 | 0.001 | 0.001 | 0.01 | 0.03 | 0.2 | 0.1 |

UNIT: LEAK AMOUNT = cc/min, TIGHTENING FACE PRESSURE = $Kg/cm^2$

GLAND PACKING

TECHNICAL FIELD

The present invention relates to a gland packing which is useful as a shaft seal device for a hydraulic machine such as a valve or a pump, and more particularly to a gland packing which is charged into a stuffing box and pressed by a packing gland in an axial direction so as to be brought into tight contact with the outer peripheral face of a shaft or a valve rod, thereby forming a shaft seal part.

BACKGROUND ART

As such a gland packing, conventionally, known is a die mold packing 51 having a usual structure shown in FIG. 25. The die mold packing 51 is configured by windingly laminating a tape-like material 50 such as an expanded graphite tape into a spiral shape, and then die-molding the lamination into a ring-like shape. Such a die mold packing 51 is used in the following manner. As shown in FIG. 26, in a stuffing box 54, the die mold packings 51, and a plurality of laminate packings 53 which are obtained by laminating ring-like sheet materials 52 having impermeability are alternately disposed on the outer periphery of a shaft or a valve rod 55 (hereinafter, referred to as "valve rod or the like") in an axial direction. Alternatively, as shown in FIG. 27, the die mold packings 51, and braided packings 56 which are well known in the art are combinedly disposed. These packings are pressed in the axial direction through a packing gland 57 so that their inner peripheral face parts are brought into tight contact with the outer peripheral face of the valve rod or the like 55, thereby performing the shaft sealing operation.

Furthermore, also a gland packing 58 is known in which, as shown in FIG. 28, a ring-like projected part 51a is formed on an end face in an axial direction of the die mold packing 51 and in an outer end portion in a radial direction so that the ring-like projected part is projected outward in the axial direction, and a ring-like recess 56a which is formed on an end face in the axial direction of the braided packings 56 and in an outer end portion in a radial direction is fitted onto the ring-like projected part 51a, thereby integrating the packings 51 and 56 into one body. Also the integrated gland packing 58 is used in the following manner. As shown in FIG. 29, the integrated gland packings 58 are combinedly disposed in the stuffing box 54 together with the die mold packings 51 having the ring-like projected part 51a. In the same manner as described above, these packings are pressed in an axial direction through the packing gland 57 so that their inner peripheral face, parts are brought into tight contact with the outer peripheral face of the valve rod or the like 55, thereby performing the shaft sealing operation.

In a prior art gland packing mainly consisting of the die mold packings 51, as shown in FIGS. 25 and 28, minute gaps 59 are inevitably formed in windingly laminated parts of the tape-like material 50. A pressurized fluid penetrates into the minute gaps 59, and leakage indicated by the arrow a easily occurs. Particularly when a gas fluid of low molecular weight flows through the hydraulic machine, it is very difficult to prevent penetration leakage from occurring.

Furthermore, the die mold packing 51 which is configured by windingly laminating the tape-like material 50 has originally a lower strength. In a use manner, the die mold packing is disposed in substantially parallel to the axis of the valve rod or the like 55. When the material is pressed in an axial direction, the material is swollen out to enter the gaps so that stress relaxation easily occurs. Furthermore, the process of the die molding is conducted at a high face pressure. When the die mold has a rectangular section shape, therefore, the die mold cannot exhibit sufficient sealing performance at a low tightening force.

Moreover, when the die mold packings 51 and the laminate packings 53 are combinedly used as shown in FIG. 26, the amount of deformation of the laminate packings 53 in the pressurizing process is small, and hence the laminate packings 53 must be produced with very high dimensional accuracy. Furthermore, the parts of the laminate packings 53 are easily worn. Even when the parts are worn at a very small amount, the contact surface pressure acting on the valve rod or the like 55 is extremely lowered, thereby producing a problem in that sealing performance is largely impaired.

The invention has been conducted in view of the above-mentioned circumstances. It is an object of the invention to provide a gland packing which can prevent penetration leakage from occurring, which can be sufficiently deformed so as to exhibit sure sealing properties even at a low tightening force, and which has following properties against a small amount of wear so as to ensure high sealing performance for a long term.

DISCLOSURE OF THE INVENTION

In order to attain the object, in the gland packing of the invention, a ring-like projected part which is projected outward in an axial direction is formed on at least one end face in an axial direction of a die mold packing part and in at least one of outer and inner end portions in a radial direction, the die mold packing part being configured by windingly laminating an expanded graphite tape into a spiral shape and die-molding the lamination into a ring-like shape, a ring-like seal member is brought into tight contact with the one end face in the axial direction of the die mold packing part excluding the ring-like projected part, and the ring-like projected part is projected in the axial direction beyond an outer face of the ring-like seal member.

Alternatively, the gland packing may be configured in the following manner. The ring-like projected part is projected outward in the axial direction from the both end faces in the axial direction of the die mold packing part and in the outer or inner end portion in a radial direction, or a ring-like projected part is projected from one end face in the axial direction of the die mold packing part and in the inner end portion in a radial direction, and also from the other end face in the axial direction of the die mold packing part and in the outer end portion in a radial direction so that the ring-like projected parts are projected outward in the axial direction. Ring-like seal members are respectively brought into tight contact with the end faces in the axial direction of the die mold packing part excluding the ring-like projected parts.

In the thus configured invention, a ring-like seal member is brought into tight contact with at least one of the end faces in the axial direction of the die mold packing part. Even when a pressurized fluid penetrates into minute gaps formed in windingly laminated parts of the expanded graphite tape constituting the die mold packing part, therefore, the leakage of the fluid is blocked by the ring-like seal member and stress relaxation due to the swelling out in the axial direction of the die mold packing part is suppressed by the ring-like seal member. The ring-like projected part which is projected outward in the axial direction is formed in the die mold packing part. When the gland packing is to be used while being charged in a stuffing box, therefore, the projected part is easily deformed only by applying a low tightening force in the axial direction, and hence the density of the projected part is increased and a large stress is generated in a radial direction of the projected part so that the packing is strongly brought into tight contact with the inner face of the stuffing box and the outer peripheral face of a valve rod or the like. This surely prevents penetration leakage from the projected part from occurring, and enhances sealing properties between the stuffing box and the valve rod. Furthermore, the ring-like projected part has a closely packed folded structure and is very elastic, and hence the ring-like projected part can satisfactorily follow a small amount of wear, thereby ensuring penetration leak prevention and high sealing properties.

In the other gland packing of the invention, a ring-like projected part which is projected outward in an axial direction is formed on at least one end face in the axial direction of a die mold packing part and in at least one of outer and inner end portions in a radial direction, the die mold packing part being configured by windingly laminating an expanded graphite tape into a spiral shape and die-molding the lamination into a ring-like shape, a ring-like seal member is brought into tight contact with the one end face in the axial direction of the die mold packing part excluding the ring-like projected part, the outer face of the ring-like seal member is formed as an oblique circular cone face which is positioned more outward in the axial direction as moving toward the ring-like projected part, and the projection end face of the ring-like projected part is substantially positioned in an extension plane of the oblique circular cone face.

The gland packing may be configured so that ring-like projected parts are respectively outward projected in the axial direction from the both end faces in the axial direction of the die mold packing part and in the outer or inner end portion in a radial direction, or ring-like seal members are respectively brought into tight contact with the end faces in the axial direction of the die mold packing part excluding the ring-like projected parts.

In the thus configured gland packing, even when a pressurized fluid penetrates into minute gaps formed in windingly laminated parts of the expanded graphite tape constituting the die mold packing part, the leakage of the fluid is blocked by the ring-like seal member and stress relaxation due to the swelling out in the axial direction of the die mold packing part is suppressed by the ring-like seal member. The ring-like projected part which is projected outward in the axial direction is formed in the die mold packing part, and the projection end face of the ring-like projected part and the outer face of the ring-like seal member are formed as an oblique circular cone face which is positioned more outward in the axial direction as moving toward the ring-like projected part. When the gland packing is to be used while being charged in a stuffing box, therefore, the projected part and the ring-like seal member are easily deformed only by applying a low tightening force in the axial direction, so that the projected part and the ring-like seal member are positioned in a plane substantially perpendicular to the axis of the valve rod or the like, and hence the density of the projected part is increased and a large stress is generated in a radial direction so that the packing is strongly brought into tight contact with the inner face of the stuffing box and the outer peripheral face of a valve rod or the like. This can surely prevent penetration leakage through the projected part from occurring, and enhance sealing properties between the stuffing box and the valve rod. Furthermore, the ring-like projected part has a closely packed folded structure and is very elastic, and hence the ring-like projected part can satisfactorily follow a small amount of wear, thereby ensuring penetration leak prevention and high sealing properties.

In the further gland packing of the invention, a ring-like projected part which is projected outward in the axial direction is formed on at least one end face in an axial direction of a die mold packing part and in at least one of outer and inner end portions in a radial direction, the die mold packing part being configured by windingly laminating an expanded graphite tape into a spiral shape and die-molding the lamination into a ring-like shape, a ring-like seal member is brought into tight contact with the one end face in the axial direction of the die mold packing part excluding the ring-like projected part, the outer face of the ring-like seal member is formed as an oblique circular cone face which is positioned more inward in the axial direction as moving toward the ring-like projected part, and the projection end face of the ring-like projected part is substantially positioned in an extension plane of the oblique circular cone face.

The gland packing may be configured so that ring-like projected parts are respectively outward projected in the axial direction from the both end faces in the axial direction of the die mold packing part and in the outer or inner end portion, or ring-like seal members are respectively brought into tight contact with the end faces in the axial direction of the die mold packing part excluding the ring-like projected parts.

The gland packing is different from the above-mentioned other gland packings only in that the oblique circular cone face constituted by the projection end face of the ring-like projected part and the outer face of the ring-like seal member is formed as a circular cone face of an inverse inclination so that the oblique circular cone face is positioned more inward in the axial direction as moving toward the projected part. According to the gland packing, sure prevention of the penetration leakage and high sealing properties can be exerted by the synergistic effect of the following configurations: the leakage of a pressurized fluid which penetrates into minute gaps formed in windingly laminated parts of the expanded graphite tape constituting the die mold packing part is prevented from occurring by the ring-like seal member; stress relaxation due to the swelling out in the axial direction of the die mold packing part is suppressed by the ring-like seal member; and, when the gland packing is to be used while being charged in a stuffing box, the projected part and the ring-like seal member are easily deformed only by applying a low tightening force in the axial direction, so that the projected part and the ring-like seal member are positioned in a plane substantially perpendicular to the axis of the valve rod or the like, and hence the density of the projected part is increased and a large stress is generated in a radial direction so that the packing is strongly brought into tight contact with the inner face of the stuffing box and the outer peripheral face of the valve rod or the like, whereby penetration leakage through the projected part is surely prevented from occurring and sealing properties between the stuffing box and the valve rod are enhanced.

As the ring-like seal member in the gland packing of each of the above-mentioned configurations, any one of a lamination of a sheet material having impermeability, a single plate, and metal foil may be selectively used.

BRIEF DESCRIPTION OF THE DRAWINGS

FIG. 13 is a longitudinal section view of a gland packing of a fourteenth embodiment of the invention.

FIG. 14 is a longitudinal section view of a gland packing of a fifteenth embodiment of the invention.

FIG. 15 is a longitudinal section view of a gland packing of a sixteenth embodiment of the invention.

FIG. 23 is a table in which stress generating states of the packings of the invention, a prior art packing, and comparison packings are listed.

FIG. 24 is a table showing results of gas-seal tests of use examples 1 to 5 of the gland packing of the invention, and use examples of prior art packings.

BEST MODES FOR CARRYING OUT THE INVENTION

Hereinafter, embodiments of the invention will be described with reference to the drawings.

First Embodiment

Figure 1:
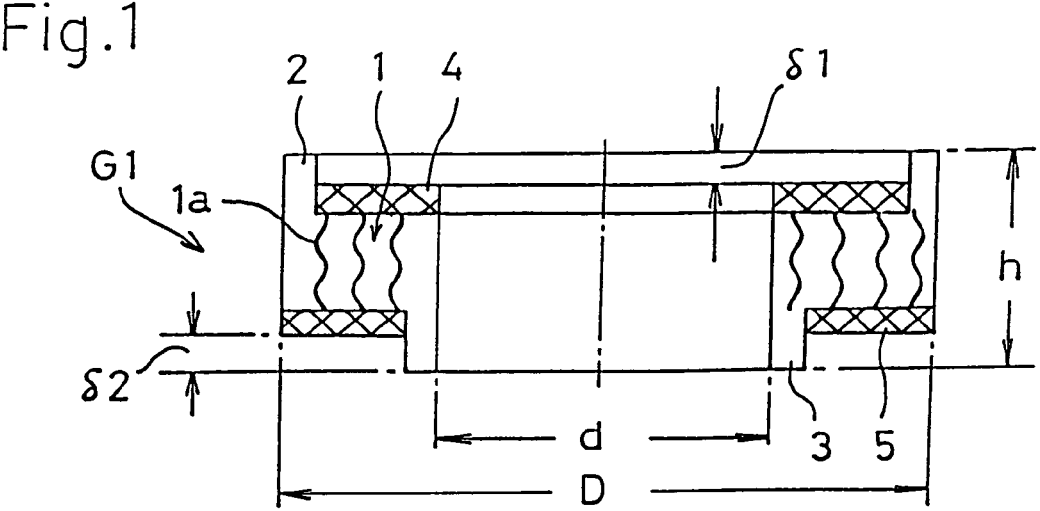
FIG. 1 is a longitudinal section view of a gland packing of a first embodiment of the invention.

FIG. 1 is a longitudinal section view of a gland packing G1 of a first embodiment of the invention. In the figure, 1 designates a die mold packing part. The die mold packing part 1 is configured by windingly laminating ah expanded graphite tape 1a into a spiral shape, and die-molding the lamination into a ring-like shape having dimensions of an inner diameter d of 32 mm, an outer diameter D of 48 mm, and a height h of 12 mm. 2 designates a ring-like projected part which is projected outward in an axial direction from one end face in the axial direction of the die mold packing part 1 and in the outer end portion in a radial direction (projection amount $\delta 1=2$ mm) and integrally formed, and 3 designates a ring-like projected part which is projected outward in an axial direction (opposite to the ring-like projected part 2) from the other end face in the axial direction of the die mold packing part 1 and in the inner end portion in a radial direction (projection amount $\delta 2=2$ mm) and integrally formed. 4 and 5 designate ring-like seal members which are respectively brought into tight contact, with the end faces in the axial direction of the die mold packing part 1 excluding the outer and inner ring-like projected parts 2 and 3. The ring-like seal members 4 and 5 are formed by laminating three punched products of an expanded graphite sheet (thickness of 0.38 mm) having impermeability, and the laminated product is compressed together with the die mold packing part 1. As a result, the section shape shown in FIG. 1 is formed. As the expanded graphite tape 1a constituting the die mold packing part 1, a product obtained by compounding (laminating) knitted meshes of a thin metal wire, or metal foil may be used. The ring-like seal members 4 and 5 may adhere to the die mold packing part 1 so as to be integrated therewith. However, the adhesion of the members is not necessary because the positioning of the members is conducted by the existence of the projected parts 2 and 3.

Second Embodiment

Figure 2:
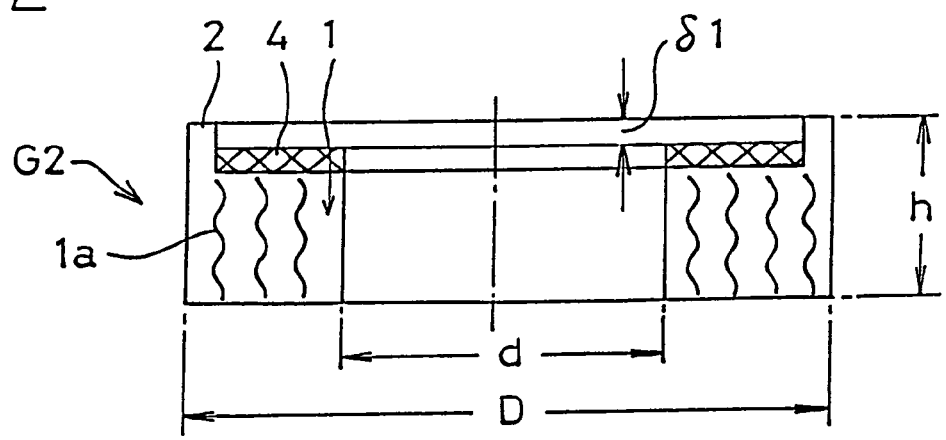
FIG. 2 is a longitudinal section view of a gland packing of a second embodiment of the invention.

FIG. 2 is a longitudinal section view of a gland packing G2 of a second embodiment of the invention. In the embodiment, a ring-like projected part 2 is projected outward in an axial direction from one end face in the axial direction of a die mold packing part 1 and in the outer end portion in a radial direction, so as to be integrally formed, and a ring-like seal member 4 is brought into tight contact with only one end face in the axial direction of the die mold packing part 1 excluding the ring-like projected part 2. The method of forming the section shape shown in the figure, the configuration of the die mold packing part 1 and the ring-like seal member 4, the dimensions (d, D, h, $\delta 1$) of the parts, etc. are the same as those of the first embodiment, and hence their detailed description is omitted.

Third Embodiment

Figure 3:
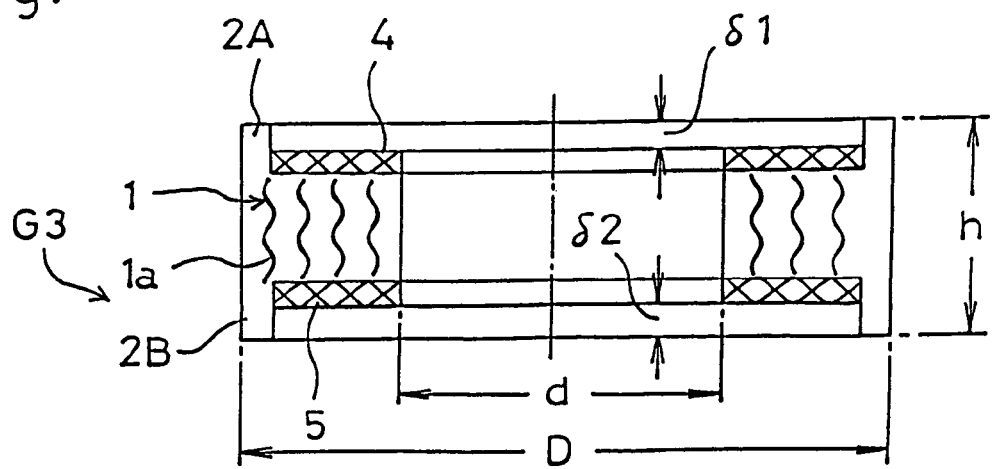
FIG. 3 is a longitudinal section view of a gland packing of a third embodiment of the invention.

FIG. 3 is a longitudinal section view of a gland packing G3 of a third embodiment of the invention. In the embodiment, ring-like projected parts 2A and 2B are projected outward in an axial direction from the both end faces in the axial direction of a die mold packing part 1 and in the outer end portion in a radial direction, so as to be integrally formed, and ring-like seal members 4 and 5 are respectively brought into tight contact with the both end faces in the axial direction of the die mold packing part 1 excluding the ring-like projected parts 2A and 2B. The method of forming the section shape shown in the figure, the configuration of the die mold packing part 1 and the ring-like seal members 4 and 5, the dimensions (d, D, h, δ1, δ2) of the parts, etc. are the same as those of the first embodiment, and hence their detailed description is omitted.

Fourth Embodiment

Figure 4:
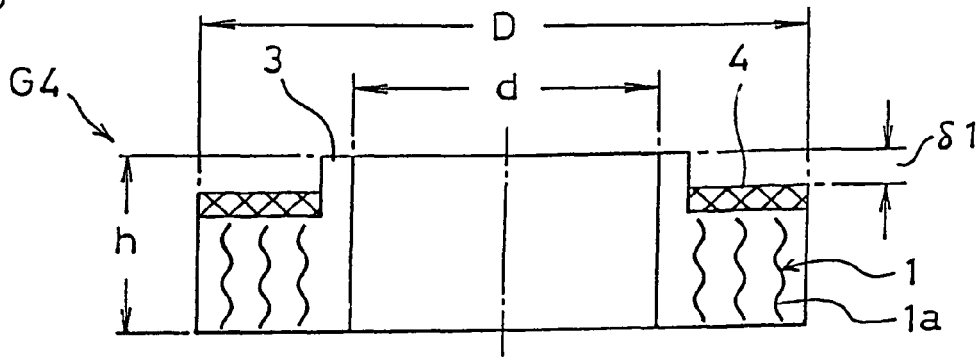
FIG. 4 is a longitudinal section view of a gland packing of a fourth embodiment of the invention.

FIG. 4 is a longitudinal section view of a gland packing G4 of a fourth embodiment of the invention. In the embodiment, a ring-like projected part 3 is projected outward in an axial direction from one end face in the axial direction of the die mold packing part 1 and in the inner end portion in a radial direction, so as to be integrally formed, and a ring-like seal member 4 is brought into tight contact with only one end face in the axial direction of the die mold packing part 1 excluding the ring-like projected part 3. The method of forming the section shape shown in the figure, the configuration of the die mold packing part 1 and the ring-like seal member 4, the dimensions (d, D, h, δ1) of the parts, etc. are the same as those of the first embodiment, and hence their detailed description is omitted.

Fifth Embodiment

Figure 5:
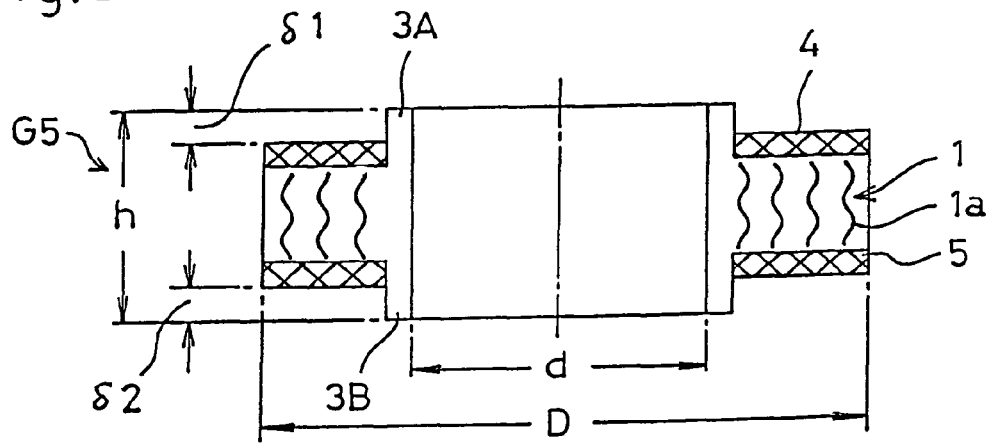
FIG. 5 is a longitudinal section view of a gland packing of a fifth embodiment of the invention.

FIG. 5 is a longitudinal section view of a gland packing G5 of a fifth embodiment of the invention. In the embodiment, ring-like projected parts 3A and 3B are projected outward in an axial direction from the both end faces in the axial direction of a die mold packing part 1 and in the inner end portion in a radial direction, so as to be integrally formed, and ring-like seal members 4 and 5 are respectively brought into tight contact with the both end faces in the axial direction of the die mold packing part 1 excluding the ring-like projected parts 3A and 3B. The method of forming the section shape shown in the figure, the configuration of the die mold packing part 1, the dimensions (d, D, h, δ1, δ2) of the parts, etc. are the same as those of the first embodiment except that punched stainless steel plates of a thickness of 0.2 mm are used as the ring-like seal members 4 and 5, and hence their detailed description is omitted.

Sixth Embodiment

Figure 6:
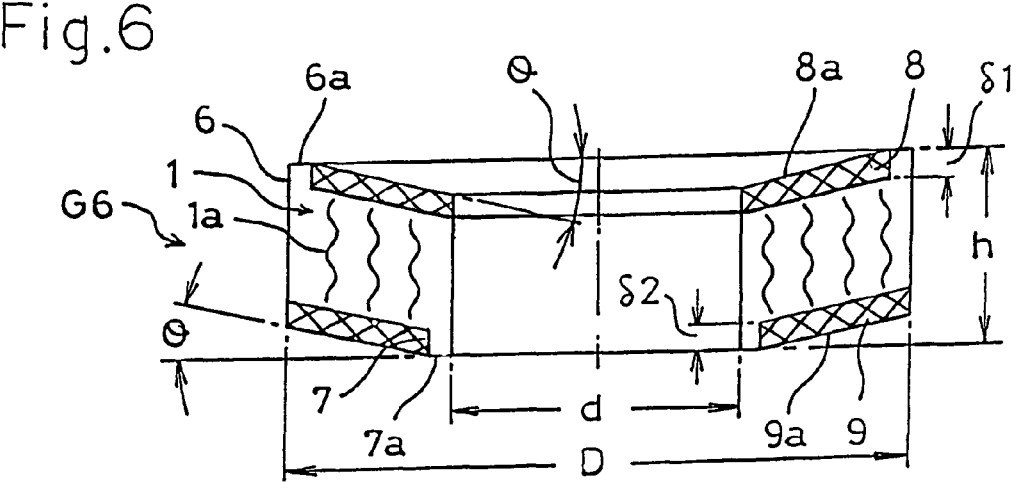
FIG. 6 is a longitudinal section view of a gland packing of a sixth embodiment of the invention.

FIG. 6 is a longitudinal section view of a gland packing G6 of a sixth embodiment of the invention. In the figure, 1 designates a die mold packing part. The die mold packing part 1 is configured by windingly laminating an expanded graphite tape 1a into a spiral shape, and die-molding the lamination into a ring-like shape having dimensions of an inner diameter d of 32 mm, an outer diameter D of 48 mm, and a height h of 10 mm. 6 designates a ring-like projected part which is projected outward in an axial direction from one end face in the axial direction of the die mold packing part 1 and in the outer end portion in a radial direction (projection amount δ1=0.2 mm) and integrally formed, and 7 designates a ring-like projected part which is projected outward in an axial direction (opposite to the ring-like projected part 6) from the other end face in the axial direction of the die mold packing part 1 and in the inner end portion in a radial direction (projection amount δ2=0.2 mm) and integrally formed. 8 and 9 designate ring-like seal members which are respectively brought into tight contact with the end faces in the axial direction of the die mold packing part 1 excluding the outer and inner ring-like projected parts 6 and 7. The ring-like seal members 8 and 9 are configured by punched stainless steel plates of a thickness of 0.2 mm so that outer faces 8a and 9a of the members are respectively formed as oblique circular cone faces which have an inclination θ of 15° to a plane perpendicular to the axis so as to be positioned more outward in the axial direction as moving toward the ring-like projected parts 6 and 7, and the projection end faces 6a and 7a of the ring-like projected parts 6 and 7 are respectively substantially positioned in extension planes of the oblique circular cone faces 8a and 9a.

Seventh Embodiment

Figure 7:
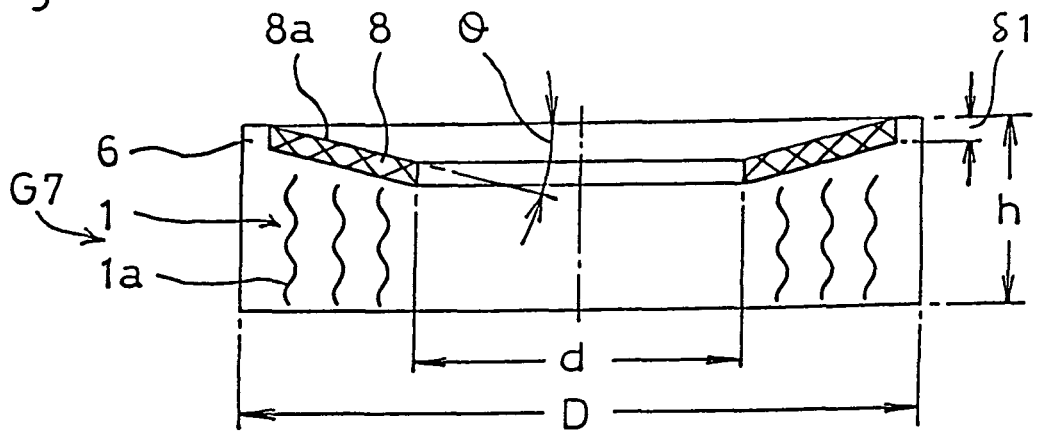
FIG. 7 is a longitudinal section view of a gland packing of a seventh embodiment of the invention.

FIG. 7 is a longitudinal section view of a gland packing G7 of a seventh embodiment of the invention. In the embodiment, a ring-like projected part 6 is projected outward in an axial direction from one end face in the axial direction of a die mold packing part 1 and in the outer end portion in a radial direction, so as to be integrally formed, and a ring-like seal member 8 is brought into tight contact with only one end face in the axial direction of the die mold packing part 1 excluding the ring-like projected part 6. The outer face 8a of the ring-like seal member 8 is formed as an oblique circular cone face which is positioned more outward in an axial direction as moving toward the ring-like projected part 6. The ring-like seal member 8 is formed by laminating three punched products of an expanded graphite sheet (thickness of 0.38 mm) having impermeability, and the laminated product is compressed together with the die mold packing part 1. As a result, the section shape shown in FIG. 7 is formed. The configuration of the die mold packing part 1 other than the above, the dimensions (d, D, h, δ1, θ of the parts, etc. are the same as those of the sixth embodiment, and hence their detailed description is omitted.

Eighth Embodiment

Figure 8:
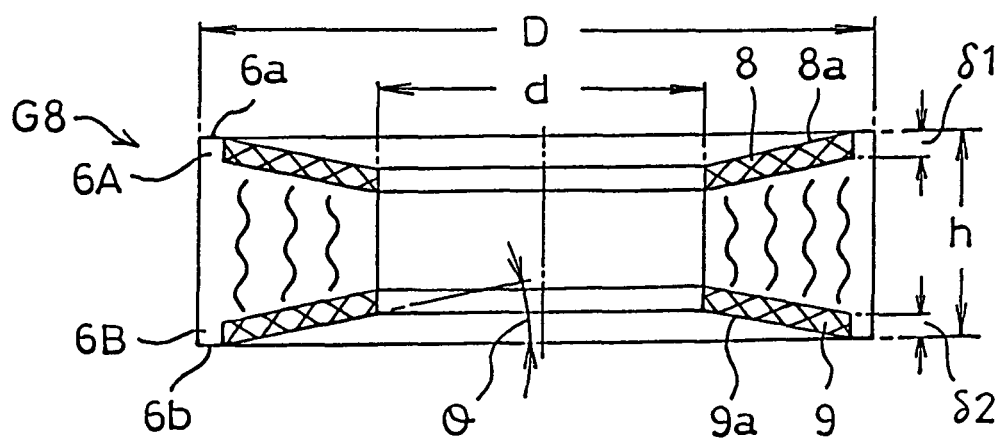
FIG. 8 is a longitudinal section view of a gland packing of an eighth embodiment of the invention.

FIG. 8 is a longitudinal section view of a gland packing G8 of an eighth embodiment of the invention. In the embodiment, ring-like projected parts 6A and 6B are projected outward in an axial direction from the both end faces in the axial direction of a die mold packing part 1 and in the outer end portion in a radial direction, so as to be integrally formed, and ring-like seal members 8 and 9 are respectively brought into tight contact with the both end faces in the axial direction of the die mold packing part 1 excluding the ring-like projected parts 6A and 6B. Outer faces 8a and 9a of the ring-like seal members 8 and 9 are respectively formed as oblique circular cone faces which are positioned more outward in an axial direction as moving toward the ring-like projected parts 6A and 6B. The ring-like seal members 8 and 9 are configured by using a punched polytetrafluoroetylene (PTFE) resin sheet of a thickness of 1.0 mm, and the sheet is compressed together with the die mold packing part 1. As a result, the section shape shown in FIG. 8 is formed. The configuration of the die mold packing part 1 other than the above, the dimensions (d, D, h, δ1, δ2, θ of the parts, etc. are the same as those of the sixth embodiment, and hence their detailed description is omitted.

Ninth Embodiment

Figure 9:
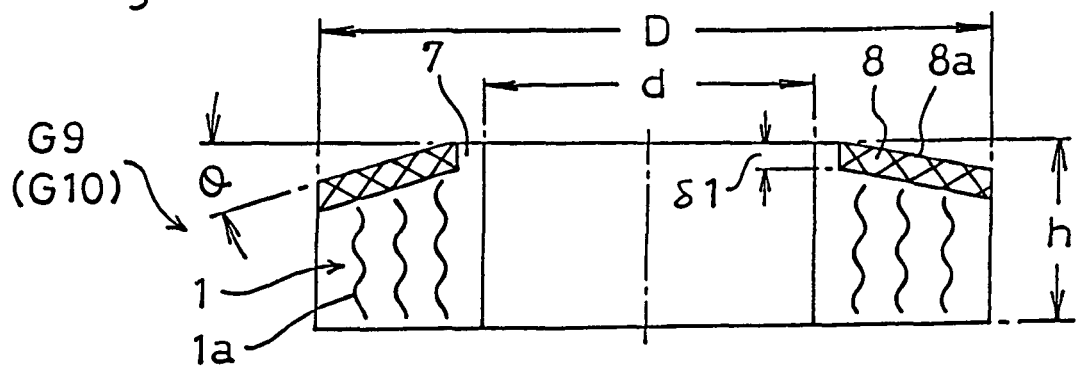
FIG. 9 is a longitudinal section view of a gland packing of a ninth embodiment of the invention.

FIG. 9 is a longitudinal section view of a gland packing G9 of a ninth embodiment of the invention. In the embodiment, a ring-like projected part 7 is projected outward in an axial direction from one end face in the axial direction of a die mold packing part 1 and in the inner end portion in a radial direction, so as to be integrally formed, and a ring-like seal member 8 is brought into tight contact with only one end face in the axial direction of the die mold packing part 1 excluding the ring-like projected part 7. The outer face 8a of the ring-like seal member 8 is formed as an oblique circular cone face which is positioned more outward in an axial direction as moving toward the ring-like projected part 7. The ring-like seal member 8 is formed by laminating three punched products of an expanded graphite sheet (thickness of 0.38 mm) having impermeability, and the laminated product is compressed together with the die mold packing part 1. As a result, the section shape shown in FIG. 7 is formed. The configuration of the die mold packing part 1 other the above, the dimensions (d, D, h, δ1, θ of the parts, etc. are the same as those of the sixth embodiment, and hence their detailed description is omitted.

Tenth Embodiment

A gland packing G10 (see FIG. 9) of a tenth embodiment is strictly the same as the ninth embodiment except that PTFE-impregnated glass fiber fabric is used as the ring-like seal member 8, and hence its illustration and detailed description are omitted.

Eleventh Embodiment

Figure 10:
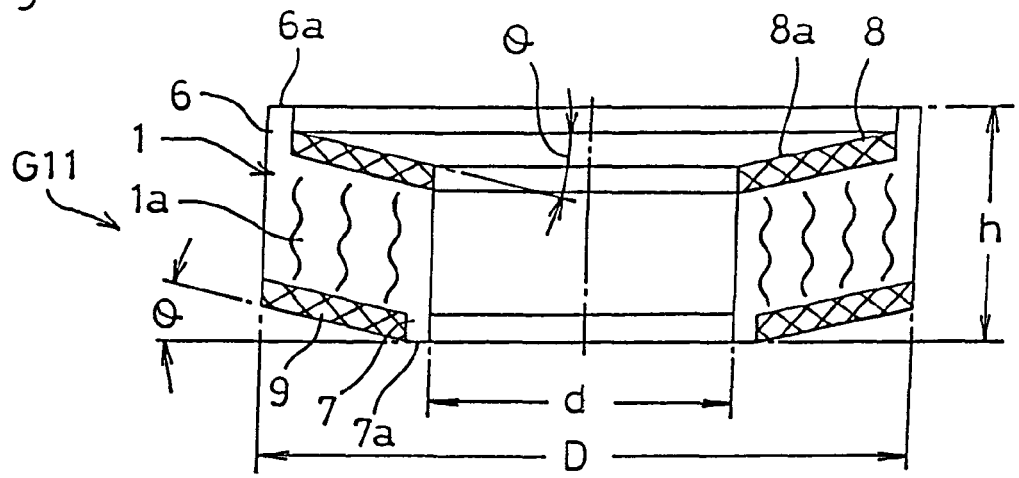
FIG. 10 is a longitudinal section view of a gland packing of an eleventh embodiment of the invention.

FIG. 10 is a longitudinal section view of a gland packing G11 of an eleventh embodiment of the invention. In the embodiment, among a ring-like projected part 6 which is projected outward in an axial direction from one end face in the axial direction of a die mold packing part 1 and in the outer end portion in a radial direction and integrally formed, and a ring-like projected part 7 which is projected outward in an axial direction (opposite to the ring-like projected part 6) from the other end face in the axial direction of the die mold packing part 1 and in the inner end portion in a radial direction and integrally formed, the projection end face 6a of the ring-like projected part 6 which is outside in a radial direction is projected outward in the axial direction beyond an oblique circular cone face 8a of one seal member 8 of ring-like seal members 8 and 9 which are brought into tight contact with the both end faces in the axial direction of the die mold packing part 1 so as to be formed as oblique circular cone faces which have an inclination θ of 15° to a plane perpendicular to the axis. The method of forming the section shape shown in the figure, the other configuration, the dimensions of the parts, etc. are the same as those of the sixth embodiment, and hence their detailed description is omitted.

Twelfth Embodiment

Figure 11:
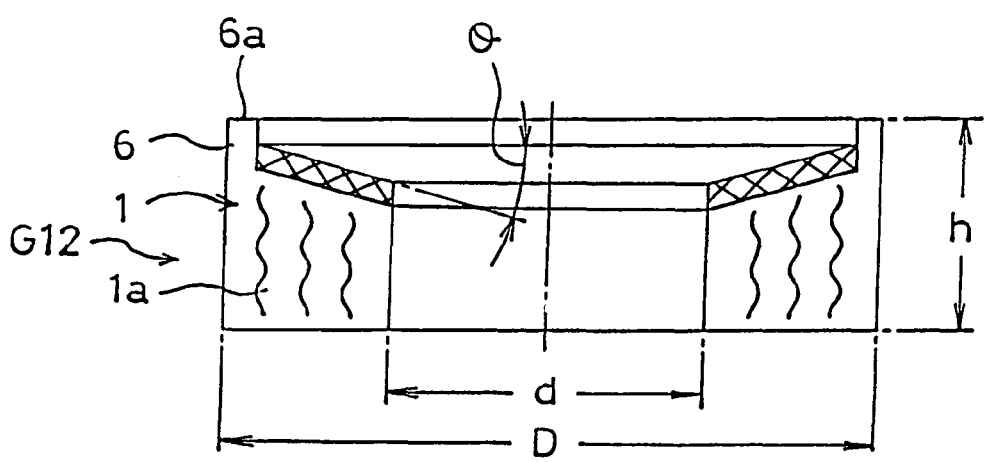
FIG. 11 is a longitudinal section view of a gland packing of a twelfth embodiment of the invention.

FIG. 11 is a longitudinal section view of a gland packing G12 of a twelfth embodiment of the invention. In the embodiment, the projection end face 6a of a ring-like projected part 6 which is projected outward in an axial direction from one end face in the axial direction of a die mold packing part 1 and in the outer end portion in a radial direction is projected outward in the axial direction beyond an oblique circular cone face 8a of a ring-like seal member 8 which is brought into tight contact on the side of the one end face in the axial direction of the die mold packing part 1 so that the outer face 8a is formed as an oblique circular cone face which is positioned more outward in an axial direction as moving toward the ring-like projected part 6. The method of forming the section shape shown in the figure, the other configuration, the dimensions of the parts, etc. are the same as those of the seventh embodiment, and hence their detailed description is omitted.

Thirteenth Embodiment

Figure 12:
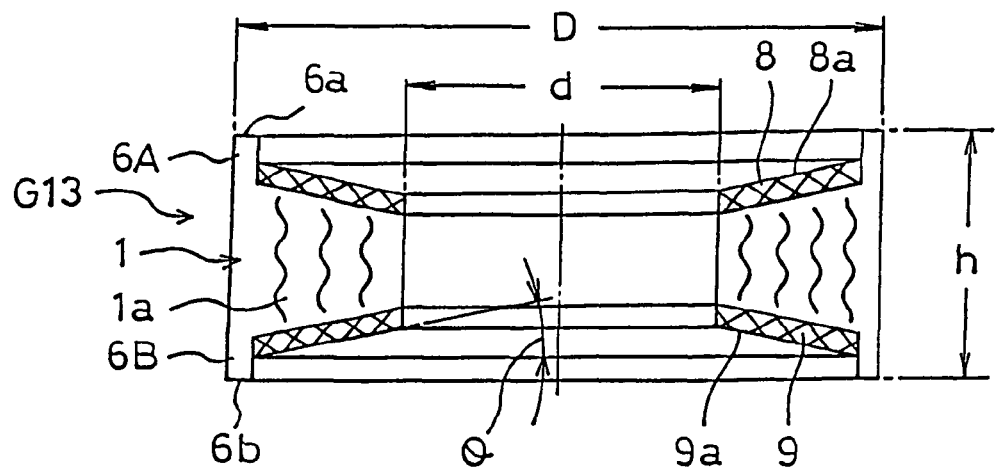
FIG. 12 is a longitudinal section view of a gland packing of a thirteenth embodiment of the invention.

FIG. 12 is a longitudinal section view of a gland packing G13 of a thirteenth embodiment of the invention. In the embodiment, the projection end faces 6a and 6b of ring-like projected parts 6A and 6B which are respectively projected outward in an axial direction from the both end faces in the axial direction of a die mold packing part 1 and in the outer end portions in a radial direction are projected outward in an axial direction beyond oblique circular cone faces 8a and 9a of the ring-like seal members 8 and 9 which are brought into tight contact with the both end faces in the axial direction of the die mold packing part 1 so that the outer faces 8a and 9a are formed as oblique circular cone faces which are respectively positioned more outward in an axial direction as moving toward the ring-like projected parts 6A and 6B. The method of forming the section shape shown in the figure, the other configuration, the dimensions of the parts, etc. are the same as those of the eighth embodiment, and hence their detailed description is omitted.

Fourteenth Embodiment

FIG. 13 is a longitudinal section view of a gland packing G14 of a fourteenth embodiment of the invention. In the embodiment, the projection end face 7a of the ring-like projected part 7 which is projected outward in an axial direction from one end face in the axial direction of a die mold packing part 1 and in the inner end portion in a radial direction is projected outward in the axial direction beyond an oblique circular cone face 8a which is brought into tight contact on the side of the one end face in the axial direction of the die mold packing part 1 so that the outer face 8a is formed as an oblique circular cone face which is positioned more outward in an axial direction as moving toward the ring-like projected part 7. The method of forming the section shape shown in the figure, the other configuration, the dimensions of the parts, etc. are the same as those of the ninth embodiment, and hence their detailed description is omitted.

Fifteenth Embodiment

FIG. 14 is a longitudinal section view of a gland packing G15 of a fifteenth embodiment of the invention. The embodiment is configured so that the outer faces 8a and 9a of the ring-like projected parts 8 and 9 which are respectively brought into tight contact with the both end faces in the axial direction of a die mold packing part 1 are respectively formed as oblique circular cone faces which have an inclination θ of 15° to a plane perpendicular to the axis so as to be positioned more inward in an axial direction as moving toward the ring-like projected parts 6 and 7, in the opposite manner as the sixth embodiment, and the projection end faces 6a and 7a of the ring-like projected parts 6 and 7 are respectively substantially positioned in extension planes of the oblique circular cone faces 8a and 9a. The method of forming the section shape shown in the figure, the other configuration, the dimensions of the parts, etc. are the same as those of the sixth embodiment, and hence their detailed description is omitted.

Sixteenth Embodiment

FIG. 15 is a longitudinal section view of a gland packing G16 of a sixteenth embodiment of the invention. In the embodiment, a ring-like seal member 8 which is brought into tight contact only on the side of one end face in an axial direction of a die mold packing part 1 is formed so that the outer face 8a is formed as an oblique circular cone face which is positioned more inward in an axial direction as moving toward a ring-like projected part 6 in the opposite manner as the seventh embodiment. The method of forming the section shape shown in the figure, the other configuration, the dimensions of the parts, etc. are the same as those of the seventh embodiment, and hence their detailed description is omitted.

Seventeenth Embodiment

Figure 16:
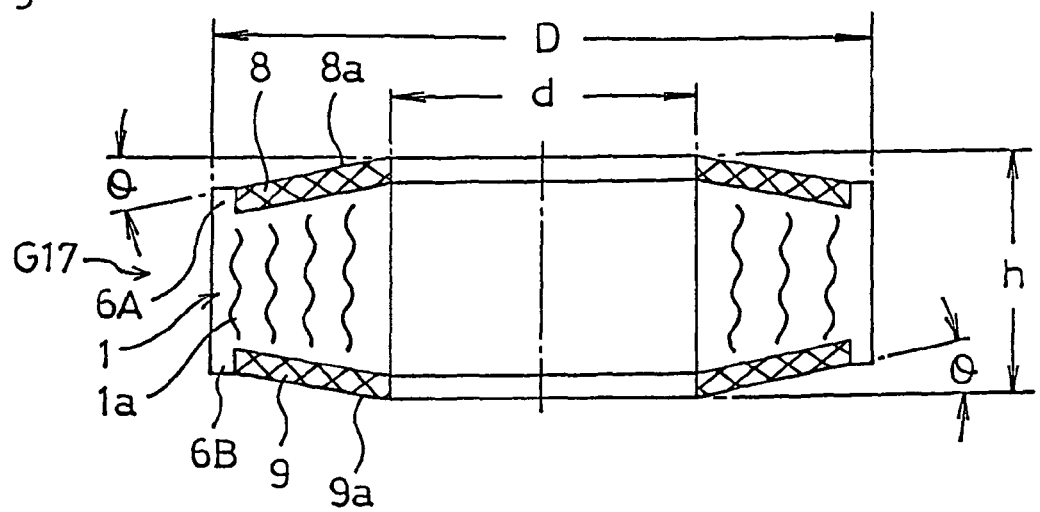
FIG. 16 is a longitudinal section view of a gland packing of a seventeenth embodiment of the invention.

FIG. 16 is a longitudinal section view of a gland packing G17 of a seventeenth embodiment of the invention. In the embodiment, ring-like seal members 8 and 9 which are respectively brought into tight contact with the both end faces in an axial direction of a die mold packing part 1 are formed so that the outer faces 8a and 9a are formed as oblique circular cone faces which are positioned more inward in an axial direction as moving toward ring-like projected parts 6A and 6B in the opposite manner as the eighth embodiment. The method of forming the section shape shown in the figure, the other configuration, the dimensions of the parts, etc. are the same as those of the eighth embodiment, and hence their detailed description is omitted.

Eighteenth Embodiment

Figure 17:
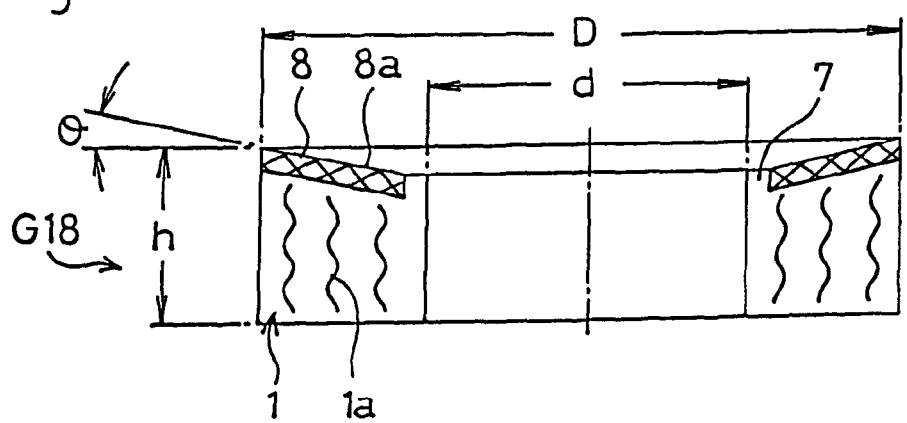
FIG. 17 is a longitudinal section view of a gland packing of an eighteenth embodiment of the invention.

FIG. 17 is a longitudinal section view of a gland packing G18 of an eighteenth embodiment of the invention. In the embodiment, a ring-like seal member 8 which is brought into tight contact only on the side of one end face in an axial direction of a die mold packing part 1 is formed so that the outer face 8a is formed as an oblique circular cone face which is positioned more inward in an axial direction as moving toward a ring-like projected part 6 in the opposite manner as the ninth embodiment. The method of forming the section shape shown in the figure, the other configuration, the dimensions of the parts, etc. are the same as those of the ninth embodiment, and hence their detailed description is omitted.

In the gland packings G1 to G18 of the embodiments, as the expanded graphite tape 1a constituting the die mold packing part 1, a product obtained by compounding (laminating) knitted meshes of a thin metal wire, or metal foil may be used. As the ring-like seal members 4, 5, 8, and 9, any sheet having impermeability may be used. In accordance with various use conditions, for example, the material of the members may be adequately selected from an expanded graphite sheet; a stainless steel plate; and a PTFE sheet; and in addition a film of polyphenylene sulfide (PPS), polyether ether ketone (PEEK), aramid, or the like; a sheet of nitrile-butadiene rubber (NBR), chloroprene rubber (CR), synthetic rubber (SR), fluoro rubber, or the like; and a metal foil or a thin plate of copper, aluminum, lead, inconel, or the like.

The ring-like seal members 4, 5, 8, and 9 may adhere to the die mold packing part 1 so as to be integrated therewith. However, the adhesion of the members is not necessary because the positioning of the members is conducted by the existence of the projected parts 2, 3, 6, and 7.

Typical use manners of the gland packings of the thus configured embodiments will be described.

USE EXAMPLE 1

Figure 18:
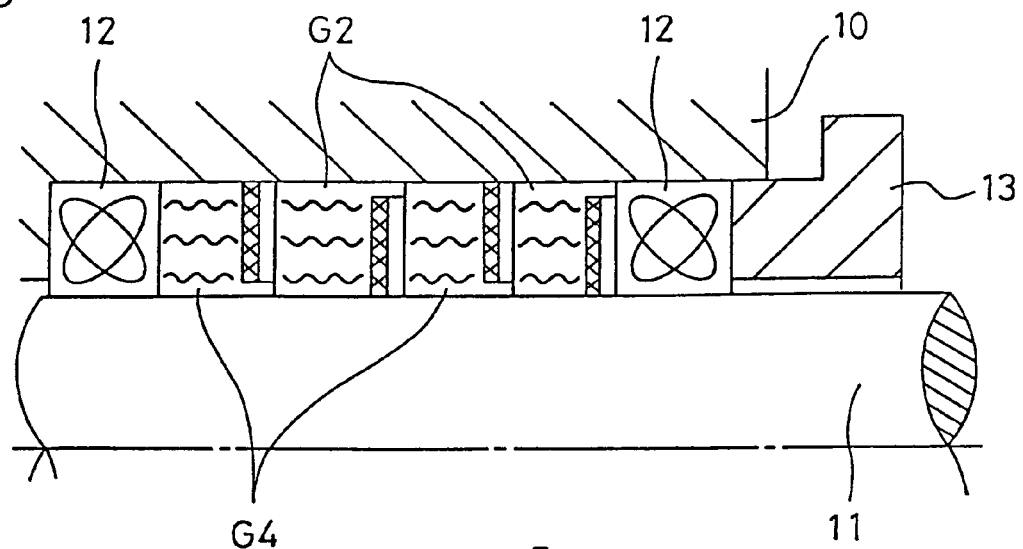
FIG. 18 is a longitudinal section view showing use example 1 of the gland packings of the embodiments of the invention.
Figure 21:
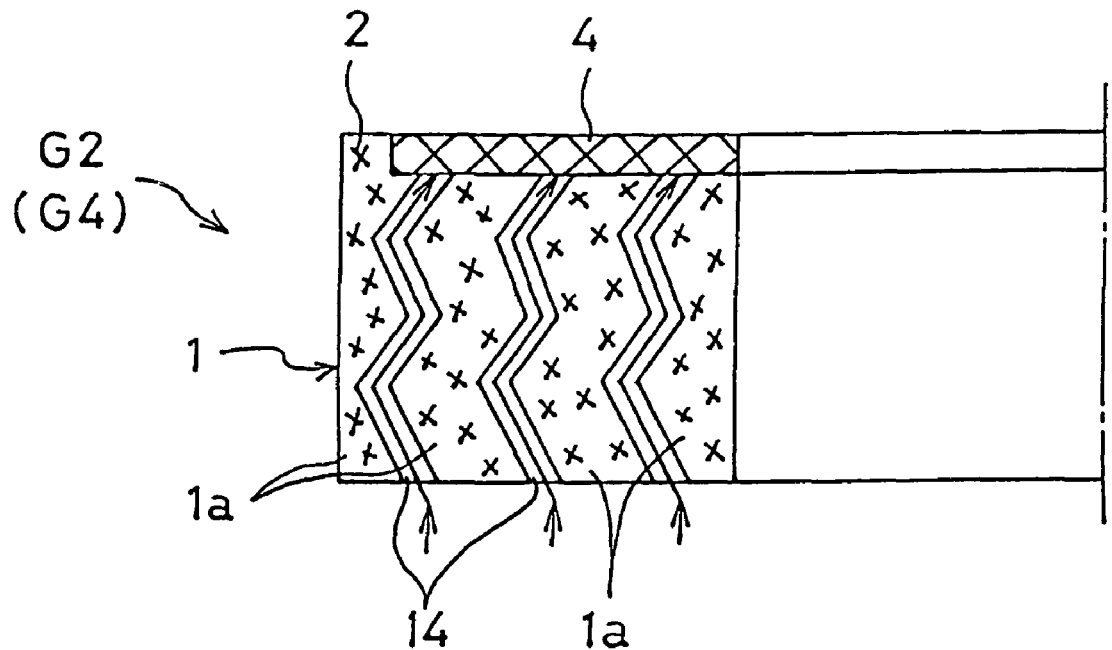
FIG. 21 is an enlarged half longitudinal section view illustrating the penetration leakage prevention action in a use state of the gland packing of the second embodiment of the invention.

FIG. 18 shows a use manner in which a plurality of gland packings G2 of the second embodiment and gland packings G4 of the fourth embodiment are alternately arranged in an axial direction on the outer peripheral face of a valve rod or the like 11 in a stuffing box 10, braided packings 12 and 12 are respectively disposed at the both ends in the axial direction of the arrangement, and a tightening force is applied to one end in the axial direction through a packing gland 13, thereby forming a shaft seal part. In the use manner, minute gaps 14 such as shown in FIG. 21 are formed in windingly laminated parts of the expanded graphite tape 1a constituting the die mold packing part 1 of each of the gland packings G2 and G4, and a pressurized fluid penetrates into the minute gaps 14. However, the leakage of the penetrating fluid to the outside is blocked by the ring-like seal member 4 and also stress relaxation due to the swelling out in the axial direction of the die mold packing part 1 is suppressed by the ring-like seal member 4. The ring-like projected part 2 which is projected outward in the axial direction from the die mold packing part 1 is easily deformed by applying a low tightening force in the axial direction, and hence the density of the projected part is increased and a large stress is generated in a radial direction so that the packing is strongly brought into tight contact with the inner face of the stuffing box 10 and the outer peripheral face of the valve rod or the like 11. This surely prevents also the leakage through the projected part 2 from occurring, and enhances sealing properties between the stuffing box 10 and the valve rod or the like 11. Furthermore, the ring-like projected part 2 has a closely packed folded structure and is very elastic, and hence can satisfactorily follow a small amount of wear, thereby ensuring penetration leak prevention and high sealing properties.

USE EXAMPLE 2

Figure 19:
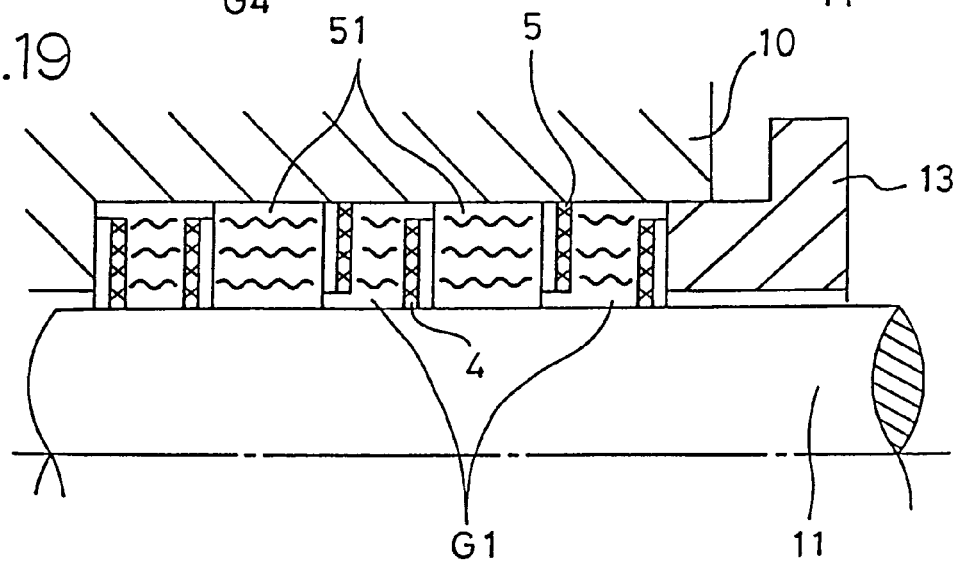
FIG. 19 is a longitudinal section view showing use example 2 of the gland packings of the embodiments of the invention.
Figure 22:
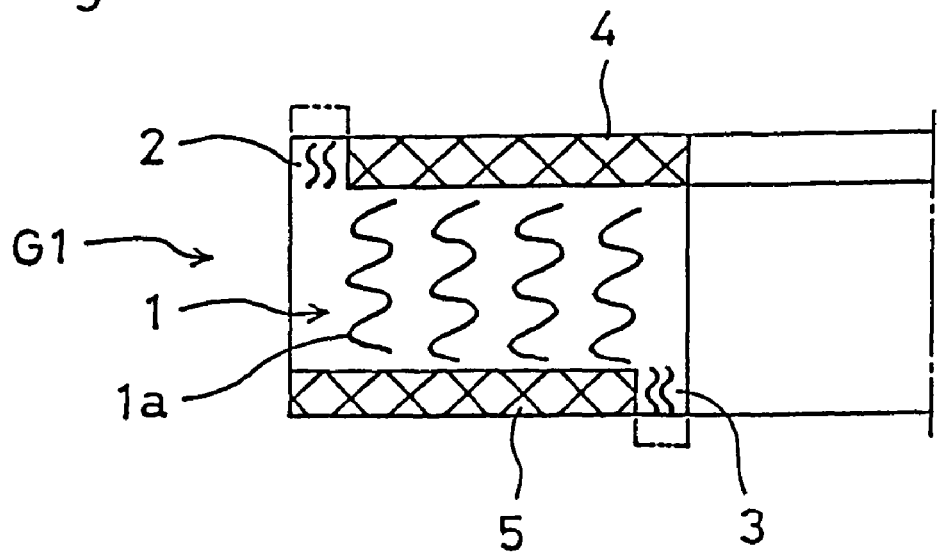
FIG. 22 is an enlarged half longitudinal section view illustrating the deformation action of a projected part in a use state of the gland packing of the first embodiment of the invention.
Figure 25:
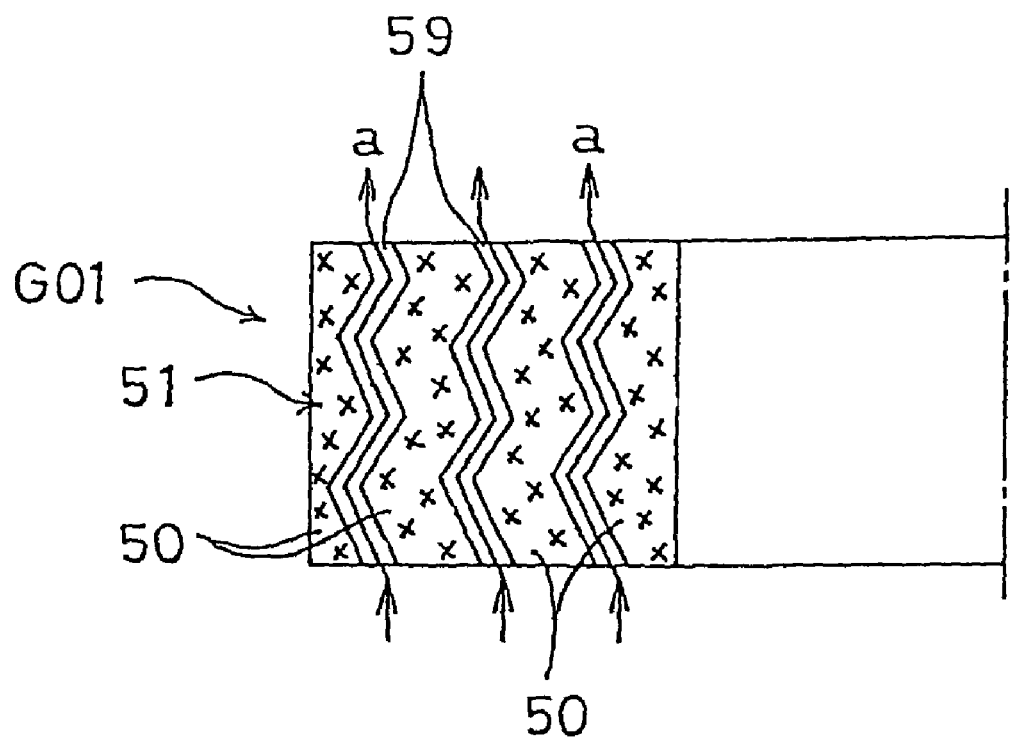
FIG. 25 is a half longitudinal section view showing an example of a prior art gland packing.
Figure 26:
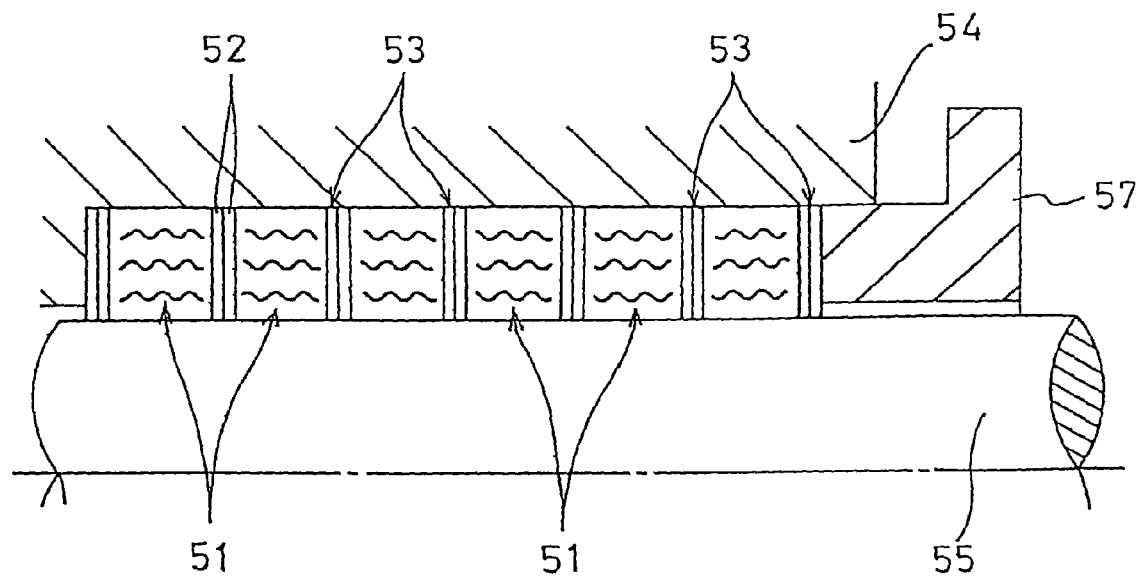
FIG. 26 is a longitudinal section view showing a use example of the prior art gland packing.

FIG. 19 shows a use manner in which a plurality of gland packings G1 of the first embodiment and gland packings 51 of the prior art shown in FIG. 25 are alternately arranged in an axial direction on the outer peripheral face of a valve rod or the like 11 in a stuffing box 10, and a tightening force is applied to one end in the axial direction through a packing gland 13, thereby forming a shaft seal part. In the use manner, even when a pressurized fluid penetrates into the minute gaps 59 such as shown in FIG. 25 formed in windingly laminated parts of the tape-like material 50 constituting the die mold packing part 51, the leakage of the penetrating fluid to the outside is blocked by the ring-like seal members 4 and 5 of the gland packing G1 and also stress relaxation due to the swelling out in the axial direction of the die mold packing part 1 is suppressed by the ring-like seal members 4 and 5. The ring-like projected parts 2 and 3 which are projected outward in the axial direction from the die mold packing part lure easily deformed as shown in FIG. 22 by applying a low tightening force in the axial direction, and hence the density of the projected part is increased and a large stress is generated in a radial direction so that the packing is strongly brought into tight contact with the inner face of the stuffing box 10 and the outer peripheral face of the valve rod or the like 11. In the same manner as use example 1 described above, this surely prevents also the leakage through the projected parts 2 and 3 from occurring, and enhances sealing properties between the stuffing box 10 and the valve rod or the like 11. Furthermore, the ring-like projected parts 2 and 3 have a closely packed folded structure and are very elastic, and hence can satisfactorily follow a small amount of wear, thereby ensuring penetration leak prevention and high sealing properties.

USE EXAMPLE 3

Figure 20:
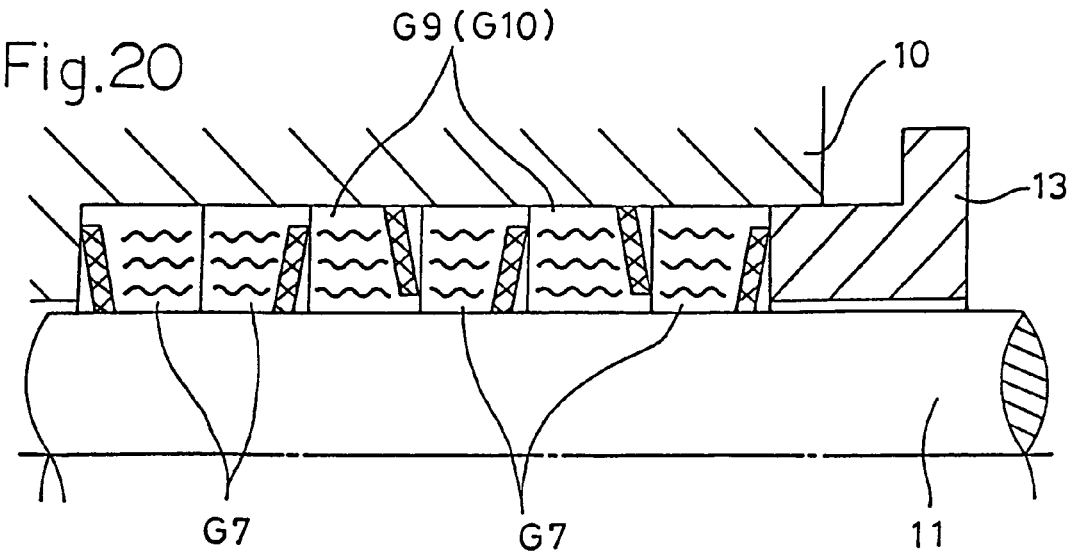
FIG. 20 is a longitudinal section view showing use examples 3 to 5 of the gland packings of the embodiments of the invention.

FIG. 20 shows a use manner in which a plurality of gland packings G7 of embodiment 7 and gland packings G9 or G10 of embodiment 9 or 10 are alternately arranged in an axial direction on the outer peripheral face of a valve rod or the like 11 in a stuffing box 10, and a tightening force is applied to one end in the axial direction through a packing gland 13, thereby forming a shaft seal part. In the use manner, in the same manner as the use examples described above, the ring-like seal member 8 blocks the leakage of the fluid penetrating into the minute gaps 14 to the outside, and suppresses stress relaxation due to the swelling out in the axial direction of the die mold packing part 1. Furthermore, the ring-like projected parts 6A and 6B and the ring-like seal member 8 are easily deformed by applying a low tightening force in the axial direction so as to be positioned in a plane substantially perpendicular to the axis of the valve rod or the like 11, and hence the density of the projected parts 6A and 6B is increased and a large stress is generated in a radial direction so that the projected parts are strongly brought into tight contact with the inner face of the stuffing box 10 and the outer peripheral face of the valve rod or the like 11. This can surely prevent penetration leakage through the projected parts 6A and 6B from occurring, and maintain sealing properties between the stuffing box 10 and the valve rod or the like 11 at a high level.

USE EXAMPLE 4

In place of the gland packings G7 and G9 or G10 used in use example 3 shown in FIG. 20, the gland packing G12 of embodiment 12 and the gland packing G14 of embodiment 14 are similarly used so as to form a shaft seal part. Also in the use manner, in the same manner as that described in use example 3, penetration leak prevention and high sealing properties between the stuffing box 10 and the valve rod or the like 11 can be maintained.

USE EXAMPLE 5

In place of the gland packings G7 and G9 or G10 used in use example 3 shown in FIG. 20, the gland packing G16 of embodiment 16 and the gland packing G18 of embodiment 18 are similarly used so as to form a shaft seal part. Also in the use manner, in the same manner as that described in use examples 3 and 4, penetration leak prevention and high sealing properties between the stuffing box 10 and the valve rod or the like 11 can be maintained.

Figure 30:
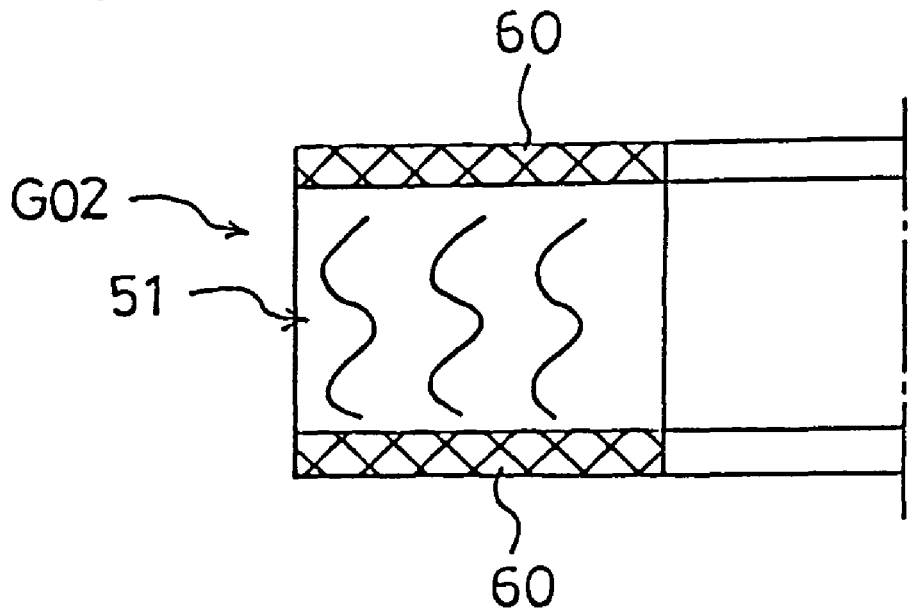
FIG. 30 is a half longitudinal section view showing an example of a gland packing which is a comparison example.
Figure 31:
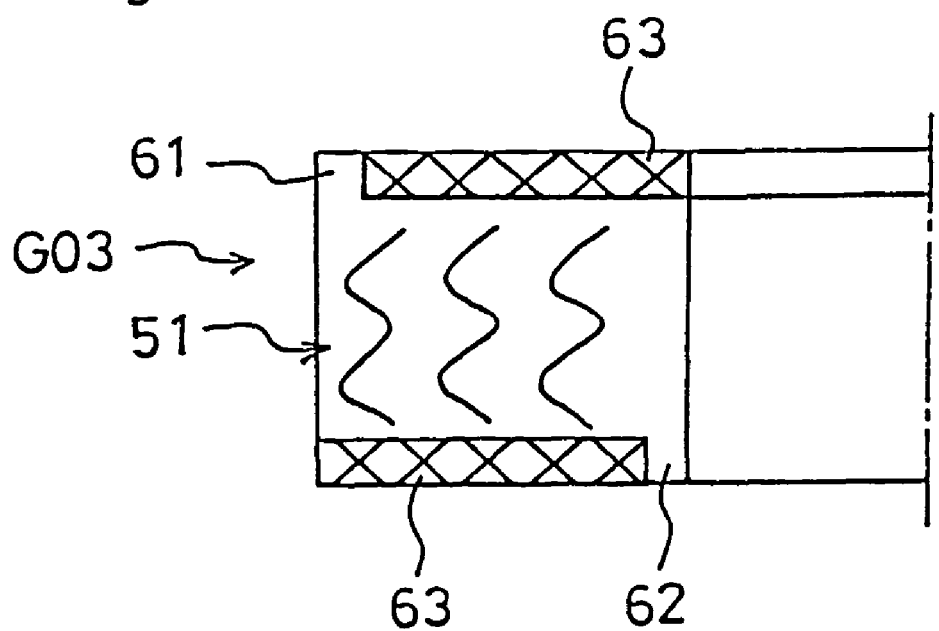
FIG. 31 is a half longitudinal section view showing another example of a gland packing which is a comparison example.

FIG. 23 is a table showing stress generating states in the case where the gland packing G1 of the first embodiment and the gland packing G6 of the sixth embodiment are used as the gland packing of the invention, a gland packing G01 consisting only of the die mold packing 51 shown in FIG. 25 is used as a prior art packing, gland packings G02 and G03 are used as comparison packings, the gland packing G02 being formed by bringing ring-like seal members 60 and 60 into tight contact with the whole area of the both end faces in the axial direction of the die mold packing 51 as shown in FIG. 30, the gland packing G03 being formed by integrally projecting ring-like projected parts 61 and 62 from the both end faces in the axial direction of the die mold packing 51 and in the outer and inner end portions in a radial direction, and bringing ring-like seal members 63 and 63 of a thickness corresponding to the same height as that of the projected parts 61 and 62 into tight contact with the both end faces in the axial direction of the die mold packing 51 excluding the projected parts 61 and 62, and a constant compression force f is applied in the axial direction to the gland packings. In the figure, the length of each arrow corresponds to the magnitude of the stress.

As seen from FIG. 23, according to the gland packings G1 and G6 of the first and sixth embodiments of the invention, the stresses of the portions corresponding to the ring-like projected parts 2 and 3, and 6 and 7 are very greater than those in the prior art packing and the comparison packings, the performance of preventing a fluid from leaking through the ring-like projected parts 2 and 3, and 6 and 7 is excellent, and the tight adhesion force against the stuffing box and the outer peripheral face of a valve rod or the like is large so as to exhibit excellent sealing properties.

Figure 27:
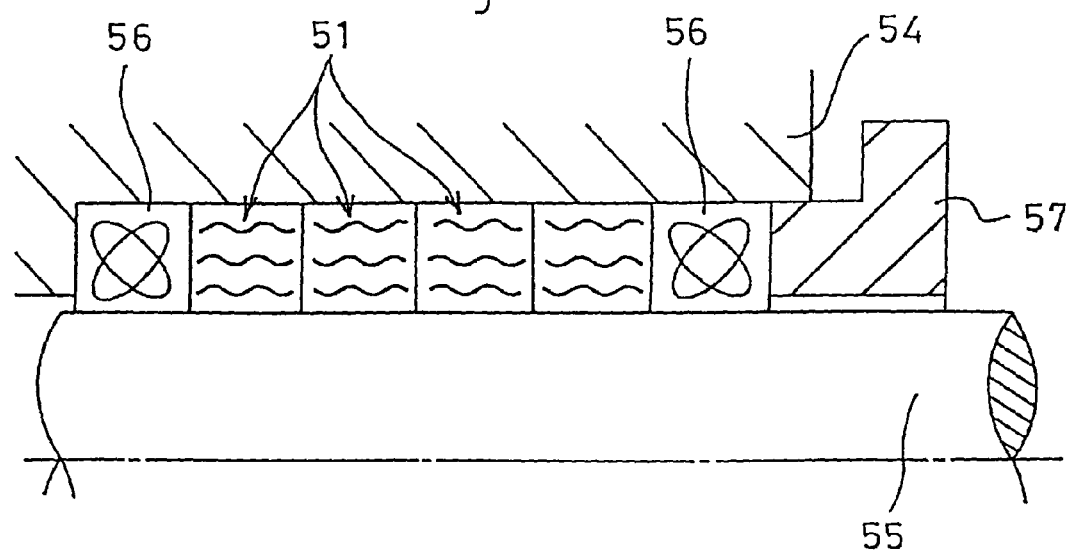
FIG. 27 is a longitudinal section view showing another use example of the prior art gland packing.
Figure 28:
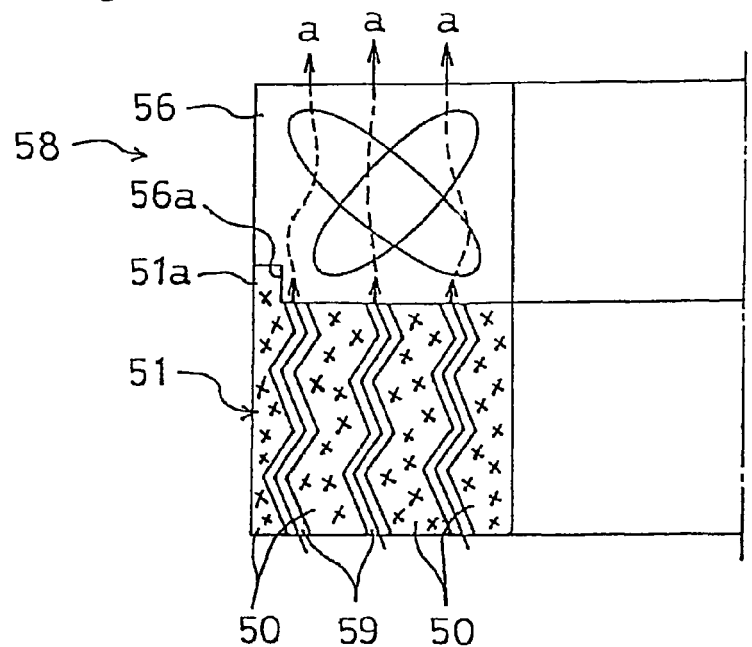
FIG. 28 is a half longitudinal section view showing another example of a prior art gland packing.
Figure 29:
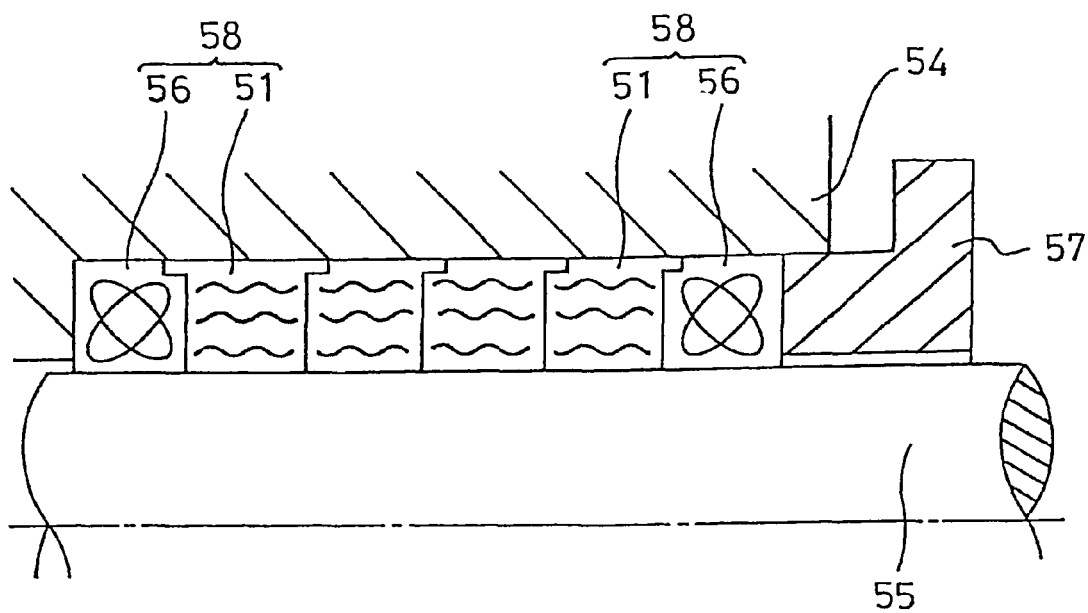
FIG. 29 is a longitudinal section view showing a use example of the gland packing of FIG. 28.

FIG. 24 is a table showing results of gas-seal tests which were conducted on use examples 1 to 5 of the gland packing of the invention, and the use examples of prior art packings shown in FIGS. 27 and 29 under the conditions that nitrogen gas N2 was filled at 21 Kgf/cm2 at ordinary temperature.

As seen from the figure, according to the gland packing of the invention, the leakage amount is very small even in the case where the tightening face pressure is low, thereby exhibiting excellent sealing properties. In a region to which a high tightening face pressure is applied, the leakage amount can be improved to a level of 1/10 to 1/100.

INDUSTRIAL APPLICABILITY

According to the invention, even when a pressurized fluid penetrates into minute gaps formed in windingly laminated parts of an expanded graphite tape constituting the die mold packing part, it is possible to prevent the fluid from leaking, and also to suppress stress relaxation due to the swelling out in an axial direction of the die mold packing part. When the gland packing is to be used while being charged in a stuffing box, furthermore, the projected part which is formed on the die mold packing part so as to be outward projected in the axial direction can be easily deformed only by applying a low tightening force in the axial direction, and hence the density of the projected part is increased and a large stress is generated in a radial direction so that the packing is strongly brought into tight contact with the inner face of the stuffing box and the outer peripheral face of a valve rod or the like. This surely prevents penetration leakage through the projected part from occurring, and the sealing properties between the stuffing box and the valve rod can be maintained at a high level. Furthermore, the ring-like projected part has a closely packed folded structure and is very elastic, and hence the ring-like projected part can satisfactorily follow a small amount of wear, thereby attaining an effect that the penetration leak prevention and high sealing properties can be maintained for a long term.

According to the invention, when the gland packing is to be used while being charged in a stuffing box, the ring-like projected part which is formed on the die mold packing part so as to be outward projected in an axial direction, and the ring-like seal member are easily deformed only by applying a low tightening force in the axial direction, so that the projected part and the seal member are positioned in a plane substantially perpendicular to the axis of the valve rod or the like, and hence the density of the projected part is increased and a large stress is generated in a radial direction so that the projected part and the seal member are strongly brought into tight contact with the inner face of the stuffing box and the outer peripheral face of the valve rod or the like. In the same manner as described above, therefore, the penetration leak prevention and high sealing properties can be maintained for a long term.

According to the invention a ring-like projected part and ring-like seal member are strongly brought into tight contact with the inner face of a stuffing box and the outer peripheral face of a valve rod or the like, only by applying a low tightening force in an axial direction, whereby the penetration leak prevention and high sealing properties can be ensured maintained for a long term.

The invention claimed is:

1. A gland packing, comprising:
    a die mold packing part formed by winding and die-molding a laminated expanded graphite tape, said formed die mold packing part defining an axial direction, a pair of end faces with one of the end faces being perpendicular to the axial direction and the other of the end faces being angled with respect to the axial direction, an inner end portion, an outer end portion, and a circumferential projected part which projects outwardly from at least one of said end faces; and
    at least one ring-shaped seal member engaging one of said pair of end faces, wherein:
    said at least one ring-shaped seal member has an inner face, an outer face, an inner peripheral surface and an outer peripheral surface, with said inner face in tight contact with one of said pair of end faces in said axial direction of said die mold packing part, said outer face of said at least one ring-shaped seal member being an oblique circular cone face extending inward at a constant slope in said axial direction when viewed in the direction of said outer end portion from said inner end portion; and
    said circumferential projected part has a projection end face positioned in a plane which is an extension of said oblique circular cone face, said circumferential projected part further has, an inner peripheral surface and an outer peripheral surface, with at least one of said inner peripheral surface and said outer peripheral surface of said projected part in tight contact with one of said inner peripheral surface and said outer peripheral surface of said at least one ring-shaped seal member.

2. The gland packing according to claim 1, wherein:
    said at least one ring-shaped seal member is selected from a lamination of a sheet material having impermeability, a single plate, and metal foil.

* * * * *

UNITED STATES PATENT AND TRADEMARK OFFICE
CERTIFICATE OF CORRECTION

| | |
|---|---|
| PATENT NO. | : 8,282,106 B1 |
| APPLICATION NO. | : 09/592761 |
| DATED | : October 9, 2012 |
| INVENTOR(S) | : Ueda et al. |

It is certified that error appears in the above-identified patent and that said Letters Patent is hereby corrected as shown below:

On the Title Page

Item [60] Related U.S. Application Data should read:

U.S. Patent Application 08/549,783 filed on Dec. 1, 1995, and granted on Sept. 8, 1998 as U.S. Patent 5,803, 464

U.S. Patent Application 09/048,251 filed on March 26, 1998, and granted on July 4, 2000 as U.S. Patent 6,082,739

Signed and Sealed this
Eighteenth Day of February, 2014

Michelle K. Lee
*Deputy Director of the United States Patent and Trademark Office*